United States Patent
Shapiro (10) Patent No.: US 6,769,073 B1
(45) Date of Patent: Jul. 27, 2004

(54) METHOD AND APPARATUS FOR BUILDING AN OPERATING ENVIRONMENT CAPABLE OF DEGREE OF SOFTWARE FAULT TOLERANCE

(76) Inventor: Benjamin V. Shapiro, 10264 Parkwood Dr., #3, Cupertino, CA (US) 95014

( * ) Notice: Subject to any disclaimer, the term of this patent is extended or adjusted under 35 U.S.C. 154(b) by 0 days.

(21) Appl. No.: 09/543,263

(22) Filed: Apr. 5, 2000

Related U.S. Application Data
(60) Provisional application No. 60/127,989, filed on Apr. 6, 1999.

(51) Int. Cl.[7] .............................................. G06F 11/00
(52) U.S. Cl. ............................. 714/11; 714/10; 714/13; 714/38
(58) Field of Search ................................ 714/38, 10, 11, 714/13

(56) References Cited

U.S. PATENT DOCUMENTS

| | | | |
|---|---|---|---|
| 5,157,780 A | * 10/1992 | Stewart et al. ................ | 714/31 |
| 5,231,640 A | * 7/1993 | Hanson et al. ................ | 714/54 |
| 5,522,036 A | * 5/1996 | Shapiro ........................ | 714/38 |
| 5,568,380 A | * 10/1996 | Brodnax et al. ............... | 714/15 |
| 5,819,022 A | 10/1998 | Bandat ................... | 395/182.14 |
| 5,892,897 A | * 4/1999 | Carlson et al. ................ | 714/31 |
| 6,189,112 B1 | * 2/2001 | Slegel et al. .................. | 714/10 |
| 6,393,582 B1 | * 5/2002 | Klecka et al. ................ | 714/11 |

* cited by examiner

*Primary Examiner*—Robert Beausoliel
*Assistant Examiner*—Michael Maskulinski
(74) *Attorney, Agent, or Firm*—Gideon Gimlan, Esq.

(57) ABSTRACT

A computer system capable of a degree of fault tolerance is disclosed wherein a target software process is split into two instances, an advanced software process and a trailing software process. The advanced process runs ahead of the trailing process. Failure recognizing mechanisms are provided for detecting failure events experienced by the advanced instance of the process. If a failure is detected, fault-finding mechanisms are activated for identifying a position of a fault and attempting to fix the fault that led to the failure within the advanced process. After the advanced process successfully re-processes the previously failing part of its execution, the trailing software process is allowed to advance.

15 Claims, 6 Drawing Sheets

METHOD AND APPARATUS FOR BUILDING AN OPERATING ENVIRONMENT CAPABLE OF DEGREE OF SOFTWARE FAULT TOLERANCE

This application continues from Serial No. 60/127,989, filed Apr. 6, 1999, now abandoned. The disclosure of said Provisional Application is incorporated herein by reference.

BACKGROUND

1. Field of Invention

The present disclosure relates generally to the field of failure-avoiding computer systems. It relates more specifically to the sub-fields of failure analysis, fault identification, and failure avoidance.

2. Cross Reference to Issued Patents

The disclosure of the following U.S. patent is incorporated herein by reference:

(A) U.S. Pat. No. 5,522,036 issued May 28, 1996 to Benjamin V. Shapiro, and entitled, METHOD AND APPARATUS FOR THE AUTOMATIC ANALYSIS OF COMPUTER SOFTWARE.

3. Description of Related Art

In the art of computer systems, a failure event is one where a computer system produces a wrong result. By way of example, a computer system may be processing the personal records of a person who was born in the year 1980 and may be trying to determine what the age of that person will be in the year 2010. Such an age determination might be necessary in the example because the computer system is trying to amortize insurance premiums for the person. Because the computer system of our example is infected with a so-called 'Y2K' bug, the computer incorrectly determines that the age of the person in the year 2010 will be negative seventy instead of correctly determining that the person's age will be positive thirty.

The failure event in this example is the production of the −70 result for the person's age. The underlying cause of the failure result is known as a fault event. The fault event in our example might be a section of computer software that only considers the last two digits of a decimal representation of the year rather than considering more such digits.

The above is just an example. There are many possible computer operations that may be characterized as a fault event where the latter eventually causes a failure event. Faults can be hardware-based or software-based. An example of a faulty piece of hardware is a Boolean logic circuit that produces an output signal having a small noise spike. Generally, this noise spike does not affect output signals of the computer system. However, if conditions are just right, (e.g., other noises add up with this small noise spike), the spike may cause a wrong output state to occur in one of the signals of the computer. The production of such a wrong output state is a failure. The above-described Y2K problem is an example of a software-based fault and consequential failure.

It is desirable to build computer systems that consistently output correct results. This generally means that each of the operational hardware modules and executing software modules needs to be free of faults.

In general, producing fault-free software is more difficult than producing fault-free hardware. Techniques are not available for proving that a given piece of computer software is totally fault-free. Software can be said to be fault-free only to the extent that it has been tested by a testing process that is itself fault-free. In real life applications, exhaustive testing is not feasible. Even a single, numerical input to a program may create a requirement for testing numerous possibilities in the range from minus infinity to plus infinity. If there are two such inputs, they may create a need for a two dimensional input testing space of infinite range. Three variables may call for a three dimensional input space, and so on. If one attempts to exhaustively run all the input combinations it will take so much time that the utility and need for the application program may be already gone.

In the mechanical arts, it is possible to make a mechanical system more reliable or robust by designing various components with more strength and/or material than is deemed necessary for the predicted, statistically-normal environment. For example, a mechanical bridge may be made stronger than necessary for its normal operation by designing it with more and/or thicker metal cables and more concrete. The added materials might help the bridge to sustain extraordinary circumstances such as unusually strong hurricanes, unusually powerful earthquakes, etc.

If there is a hidden fault within a mechanical structure, say for example that internal chemical corrosion creates an over-stressed point within one cable of a cable-supported bridge, the corresponding failure (e.g., snapped cable) will usually occur in close spatial and/or temporal proximity to the fault. The cause of the mechanical failure, namely the chemical corrosion inside the one cable, will be readily identifiable (in general). Once the fault mechanism is identified, the replacement cable and/or the next bridge design can be structured avoid the fault and thereby provide a more reliable mechanical bridge.

Computer software failures are generally different from mechanical system failures in that the software failures do not obey the same simplified rules of proximity between the cause (the underlying fault) and effect (the failure). The erroneous output of a computer software process (the failure) does not necessarily have to appear close in either time or physical proximity to the underlying cause (fault).

A number of so-called, fault-tolerant techniques exist in the conventional art. A first of these techniques applies only to hardware-based faults and may be referred to as 'checkpoint re-processing'. Under this technique, a single piece of hardware moves forward from one operational state to the next. Every so often, at a checkpoint, the current state of the hardware is stored into a snapshot-retaining memory. In other words, a retrievable snapshot of the complete machine state is made. The machine then continues to operate. If a hardware failure is later encountered, the machine is returned to the state of its most recent checkpoint snapshot and then allowed to continue running from that point forward. If the hardware failure was due to random noise or an intermittent circuit fault, these faults will generally not be present the second time around and thus the computer hardware should be able to continue processing without encountering the same failure again. Of course, if the fault is within the software rather than the hardware, then re-running the same software will not avoid the fault, but rather will merely repeat the same fault and will typically manifest its consequential failure.

A second of the so-called fault-tolerant techniques may be referred to as 'majority voting'. Here, an odd number of hardware circuits and/or software processes each processes the same input in parallel and produces a respective result. In the case of the software processes, it may be that different groups of programmers worked independently to encode solutions for a given task. Thus, each of the software programming groups may have come up with a completely different software algorithm for reaching what should be the same result if done correctly.

When the different hardware and/or software processes complete their operations, their results are compared. If the results are different, then a vote is taken and either the majority or greatest plurality with a same result is used as the valid result. This, however, does not guarantee that the correct result is picked. It could be that the majority or winning plurality is wrong, despite their numerical supremacy. The voting process itself may be the underlying cause for a later-manifested failure. This is an example showing that adding more software (e.g., coding and executing different versions of software) to software does not necessarily lead to more reliable and fault-free operation.

Software systems are often asked to operate in input space which has not been previously encountered. A crude analogy is that of an automated spaceship moving forward in space towards uncharted regions. The spaceship encounters a new situation that was not previously anticipated and tested for. The question is then raised, are we going to return the spaceship to Earth to reprogram it? And if so, what are we going to reprogram it to deal with? We have not allowed it to operate into the unknown future yet and thus we have not yet experienced the future set of inputs with which we want to deal. It is only by actually going forward that we can observe and analyze the spaceship's behavior or the behavior of the ship's software systems. But are we going to risk malfunctioning of the ship's software systems or the destruction of the ship?

In view of the above, it is seen that significant problems exist in the software arts. There is a need for computer structures, systems and methods which can better avoid failures during execution.

SUMMARY OF INVENTION

A computer system in accordance with the invention includes an Advanced Software Processor (ASPr) and a Trailing Software Processor (TSPr). The ASPr is allowed to move forward along a stream of process events ahead of the TSPr. Process events can include an execution of either a statement in a source code file, or an execution of an opcode (assembly-level statement) within an object code file, or an execution of a SUM-Object code segment as the latter is defined in the above-referenced U.S. Pat. No. 5,522,036.

In accordance with the invention, a so-called "Target Software Process" (TSP) is replicated within a computer system to define an "Advanced Software Process" (ASP). The ASP generally executes ahead of the TSP on a common stream of process events. The TSP is permitted to continue its executions, while trailing behind the ASP by a safe distance. As long as the ASP does not encounter a failure event, the TSP is permitted to continue moving forward as well.

In one embodiment, each time the ASP passes through a predefined one of plural filters, the ASP signals that a failure has not yet been encountered. In response, the state of a previous safety-stoppoint is flipped from that instructing the TSP (Trailing Software Process) to stop to one that permits the TSP to proceed through. The TSP thereby moves forward from behind one safety-stoppoint to a next with the confidence that the ASP has already passed through to a future filter without experiencing a failure.

One or more failure-recognizing filters are provided and coupled to a corresponding one or more outputs of the ASP for recognizing failure events of the ASP. If a failure is recognized to have occurred in the ASP, then the TSP is preferably instructed to immediately pause its operations. Alternatively or additionally, permission is withheld from the trailing TSP to proceed forward through a next of its safety-stoppoints.

In response to the recognition of a failure event within the ASP, a knowledge-deduction (KD) process is initiated for identifying the probable point of fault within the past processing of the ASP which led to the manifestation of the recognized failure. The knowledge-deduction process may be carried out as described in the above-referenced U.S. Pat. No. 5,522,036.

If the knowledge-deduction process locates an area of correctness-uncertainty (a possible fault), then the ASP is returned to a previously-saved, checkpoint state that occurs prior to the possible-fault event or alternatively to a point of process origin.

If the identified fault is of a type which is known, and a predefined solution exists for this type of fault, then the predefined solution is applied to the ASP. The ASP is then allowed to proceed forward from the point it was returned to. In the meantime, the TSP (Trailing Software Process) should be stopped until the ASP (Advanced Software Process) succeeds in moving through the process, this time without detection of a failure.

If a predefined solution to the identified fault is either not known or there is an uncertainty about a proposed solution, then trial and error may be performed where the ASP proceeds through applied test solutions one or more times until failure is no longer encountered.

Thus the ASP acts as an advanced scout which experiences the future, and its possible failures, while generally protecting the TSP (Trailing Software Process) from experiencing the same failures. Output devices are attached to the TSP and thus do not exhibit failures caught by the ASP.

Other aspects of the invention will become apparent from the below detailed description.

BRIEF DESCRIPTION OF THE DRAWINGS

The below detailed description makes reference to the accompanying drawings, in which.

DETAILED DESCRIPTION

Figure 1A:
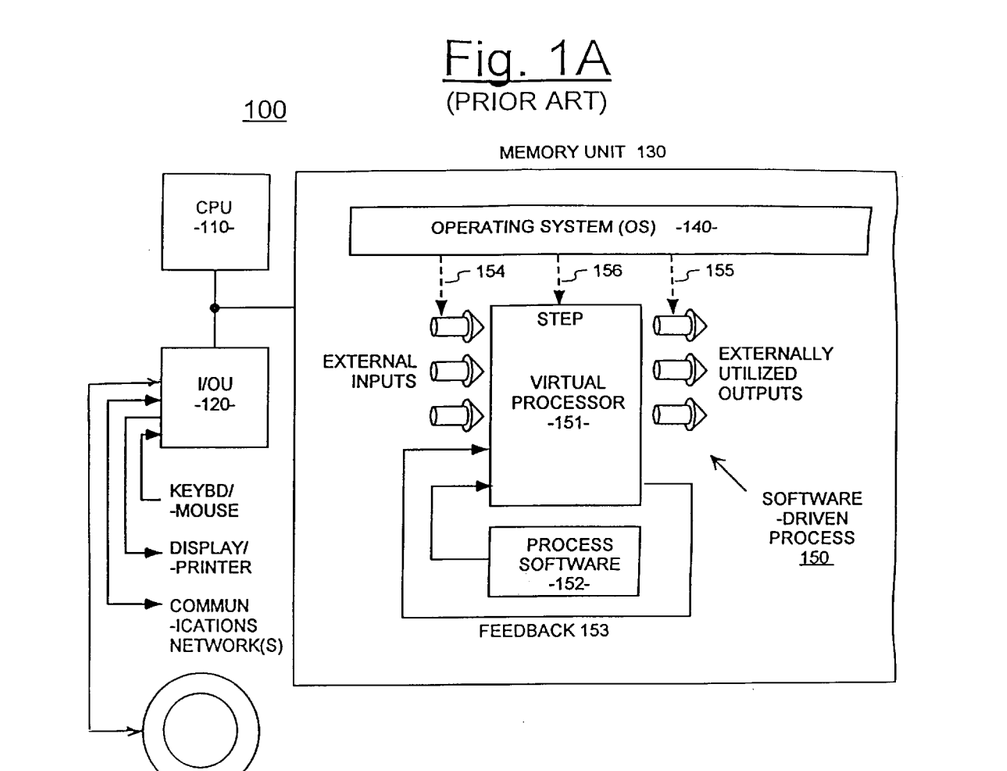
FIG. 1A depicts a conventional computer.

FIG. 1A is a block diagram of a conventional computer system 100 including a CPU (Central Processing Unit) 110 or, if desired, plural processing units (PU's, not shown). CPU 110 is operatively coupled to an input/output unit (I/OU) 120 and to a memory unit 130. I/OU is generally coupled to one or more input/output devices such as, for example, a keyboard, mouse, visual display, hard copy printer, floppy diskette drive, other memory devices, and one or more communication networks. Software may be loaded into the memory unit 130 by way of computer-usable loading means such as the floppy diskette drive or other memory devices (not shown separately from 130) or the one or more communication networks. Memory unit 130 may be comprised of one or a combination of RAM (Random Access Memory), magnetic hard disk, magnetic optical hard disk, etc. Memory unit 130 may be used to implement a larger, virtual memory space.

Cooperative operation of the CPU 110 and memory unit 130 defines an operating system (OS) 140 as depicted within the schematic representation of unit 130. Time-multiplexed or other operation of the CPU (or plural PU's) and the memory unit 130 further defines at least one virtual processor 151 that is driven by corresponding process software 152.

The OS 140 establishes one or more input pipes or input handles 154 by way of which the virtual processor 151 may receive external inputs. These external inputs may be from physical input devices such as a keyboard or mouse, or they may be outputs received from another process or they may be inputs from a predefined input file. The OS 140 further establishes one or more output pipes or output handles 155 by way of which virtual processor 151 can transfer results outputs for external utilization. These externally utilized outputs may be operatively coupled to physical devices such as a visual display or a hard copy printer or to an output file. They may also be coupled to a subsequent process or through a communications network to another computer system.

Some outputs of the virtual processor 151 may be used only internally rather than being output for external use. Such internally-used signals are represented by feedback connection 153. Using a control connection such as shown at 156, the OS 140 allows virtual processor 151 to step forward from one state to a next. Control connection 156 may also be used to temporarily halt the sequence of states of virtual processor 151. The operative combination of virtual processor 151 and process software 152 may be referred to as a software-driven process 150.

Although not shown, one or both of processor 151 and process software 152 may include hidden faults which can cause the externally-utilized outputs (155) of the process 150 to have incorrect results (failures) for certain combinations or sequences of inputs (154).

Figure 1B:
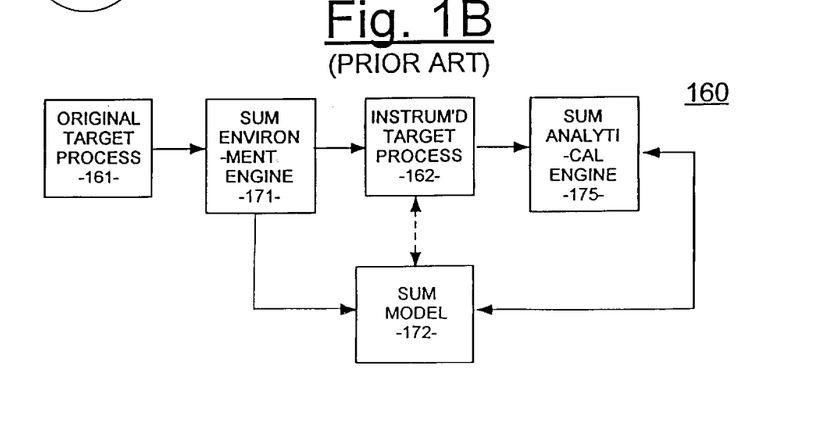
FIG. 1B provides a block diagram of an environment of a Software Understanding Machine (SUM)

Referring to FIG. 1B, there is shown a Software Understanding Machine™ system 160 such as described in the above-cited U.S. Pat. No. 5,522,036. (Software Understanding Machine™ is a trademark of Thinking Software, Inc.) In system 160 an original target process 161 is submitted to a SUM environment engine (SUM/EE) 171. Engine 171 is part of a Software Understanding Machine (SUM) and produces a corresponding, instrumented target process 162 and a SUM model 172, that can, in one embodiment, represent an attribute of the instrumented target process 162. The instrumented target process 162 communicates with a SUM analytical engine 175. The SUM/AE 175 analyzes the instrumented target process 162 while the latter runs. By operating on the SUM model 172, the SUM/AE 175 can perform knowledge induction and knowledge deduction processes. As such, when the concept of SUM system 160 is applied to the software-driven process 150 of FIG. 1A, a knowledge-induced and a knowledge-deduced understanding of process 150 may be obtained.

Knowledge-deduced understanding of a software-driven process (e.g., 150) may be advantageously used to identify faults.

Figure 2:
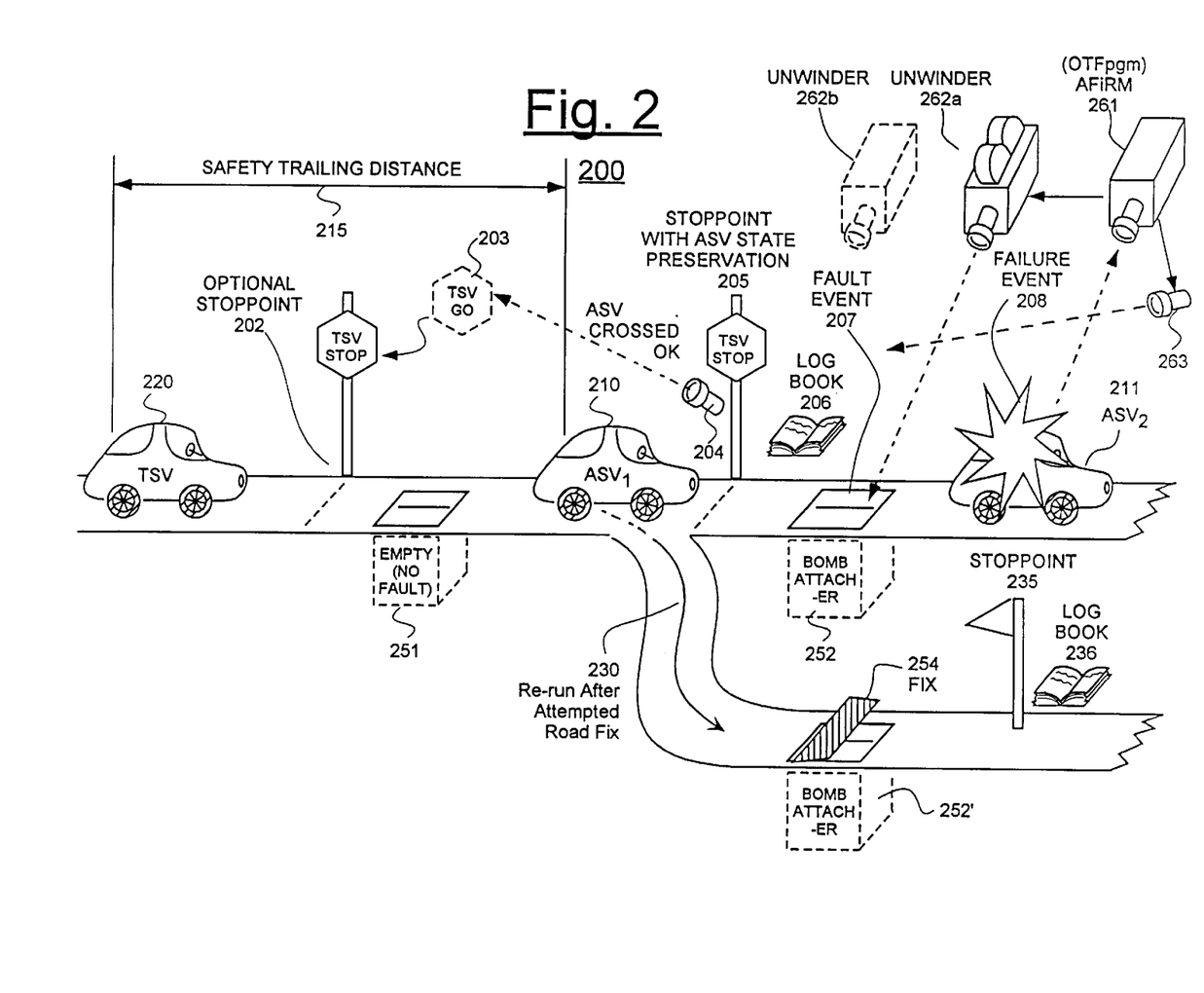
FIG. 2 provides a cartoon illustration for explaining in a simplified manner some of the fundamental aspects of the invention.

The depictions in FIG. 2 are merely a simplified analogy that resorts to cartoon characters for explaining some of the operations that may be carried out in accordance with the invention. Assume that a cartoon movie of a war game is being shown. The battle is between a fictitious Green army (good guys) and a Blue army (bad guys). Assume the Green army wishes to safely transport their General across a maze of roads that may have been sabotaged by the Blue army. It is desirable to transport the General from a starting point to a finishing point as quickly as possible with out allowing the Green army General to be blown up (to experience a failure).

The methods of sabotage used by the Blue army can vary and are such that, generally speaking, the sabotage either cannot be immediately detected when first passing over it, or it cannot be seen or otherwise detected because the speed of the General's car is too fast, or because there are too many decoys (e.g., 251) and it is not economical to stop and examine each possibly sabotaged site (251, 252, etc.).

An example of a hidden and not-sabotaged site (a fault-free site) is shown at 251. The road can be filled with a very large number of such sites. An example of a hidden and sabotaged site is shown at 252. Typically, a given road will have either a very small number or no such sites.

Suppose a particular sabotaged site 252 contains a hidden mechanism that opens up a camouflaged trap door and quickly attaches a magnetically-attachable time-delayed (and/or distance delayed) bomb to the bottom of a passing car (e.g., 210) at the moment the car passes over the sabotage site 252. The mechanism acts so quickly that only a time-consuming inspection process will reveal its presence and how it causes failure to occur later on. Some random time and/or distance after the bomb attaches, the bomb explodes as indicated by failure event 208. The car is destroyed.

Assume in this cartoon analogy that the travel of car 210 from the true-sabotage site 252 until the site of the manifested failure 208 has been filmed by an unwindable movie camera 262a that is also a character within the cartoon movie. Movie camera 262a can be rewound to play back, in reverse time motion, the events that transpired between the fault event 207 of bomb attachment site 252 and the actual failure event 208. The reverse motion, tracing back process can be used to locate the site 252 where the fault event happened, where the fault event caused the failure 208.

To get their General quickly across a maze of possibly-sabotaged roads, the Green army builds an Advanced Scouting Vehicle (ASV) 210 which does not contain the General, but is otherwise an essential replica of a second vehicle 220 that does contain the Green army General. This second vehicle is designated as a Trailing Safer Vehicle (TSV) 220.

The TSV (Trailing Safer Vehicle) 220 trails behind the ASV 210 by some finite, safety trailing distance 215. Optional stopping points such as 202, 205 are defined by the Green army along the possibly sabotaged roadway. When TSV 220 arrives at an optional stoppoint such as 202, the TSV 220 stops and waits for an OK signal 204 from the leading ASV 210. The ASV 210 activates the OK-to-proceed signal 204 when the ASV 210 safely reaches a next stoppoint such as 205 without having yet experienced a failure (e.g., 208). When the OK-to-proceed signal 204 is given, the 'TSV Stop' state of stoppoint 202 is converted into a 'TSV Go' state 203 and the TSV 220 is thereby given permission to continue moving forward along the road, which it does until it reaches the next optional stoppoint 205.

An Advanced Failure Recognition Module (AFiRM) 261 follows the Advanced Scouting Vehicle (ASV) 210 and becomes triggered when a recognizable failure event 208 occurs to the ASV, such as in the depicted $ASV_2$ state, 211. In one embodiment the AFiRM 261 is programmable on-the-fly (OTFpgm) such that the definition of what is a failure event can be entered into module 261 dynamically as the ASV 211 encounters each new event even if that event had not been previously experienced and defined as a failure event. Being blown up is not the only possible failure event, it is merely a more dramatic example. After inspection, the Green army may learn that sabotage site 252 punctured a hole into the gas tank of ASV 210 and that the failure event was that of vehicle 210 running out of gas. Or perhaps sabotage site 252 punctured a slow-leak hole into a tire of ASV 210 and the failure event was that of the tire going flat. Many different kinds of faults and consequential failure events are possible.

When AFiRM 261 recognizes a failure event (e.g., 208), the AFiRM 261 signals movie camera 262a to begin a time-reversing, unwinding operation. In one preferred embodiment, the AFiRM 261 further signals the TSV 220 to immediately stop by way of a signaling means 263 (e.g., a red warning flashlight). If the 'stop-immediately' signaling means 263 is not used, then the optional stoppoints such as 202, 205 should be used. The failure of the stopped ASV 211 to signal back an OK (204) to the TSV 220 will result in the TSV halting at the next stoppoint (e.g., 205) that the TSV encounters.

Unwinder unit 262a is adapted to backtrack along the road while looking for the location and mechanism of the sabotaged site 252. After locating the sabotaged site 252 whose actions (fault event 207) caused the later-detected, failure event 208, the unwinder 262a continues unwinding, to reach an even earlier-in-time state depicted as 262b.

At various checkpoint times during the travel of the ASV 210 along the possibly-sabotaged road (the Green army does not know for sure that it is sabotaged until after failure event 208 happens), the Green army makes a complete, snapshot log 206 of the state of the ASV. This snapshot recorded in a log book. This log book 206 may be used to make an exact replica of the Advanced Scout Vehicle in the state ($ASV_1$) at which it was at the time a particular checkpoint log entry was made. In our example such a log entry is made at optional stoppoint 205. Thus, stoppoint 205 is associated with a coincident checkpoint preservation of the state of the ASV 210 as it passed stoppoint 205. (Stoppoints and checkpoints are not synonymous and do not have to be coincident. In one embodiment that uses signaling means 263 to stop the TSV 220 there need not be any stoppoints whatsoever.) In other words, the ASV state-preserving checkpoints may occur anywhere along the road at the discretion of the Green army.

In our example, the Advanced Scout Vehicle experiences a failure (it blows up) when it reaches state $ASV_2$ (211). By using both of unwinder states 262a and 262b, the Green army can identify an ASV state preservation point (e.g., checkpoint 206) which occurs before fault event 207. Thanks to the miracles of cartooning, a complete replica 210' of the Advanced Scouting Vehicle in state $ASV_1$ can be reproduced on the road at the identified logging position 206.

Upon inspecting the identified sabotage site (fault location) 252, the Green army may or may not be able to figure out how it causes the ASV 210 to experience a failure later in the future (at state 211). The Green army makes an attempted fix 254 at site 252, such as trying to patch-over the trap door of the bomb attacher unit 252' so that it will no longer be able to open its trap door and attach a magnetic bomb. Perhaps the attempted fix is to make the bottom of the next-run ASV 210' nonmagnetic. Many possible fixes may be possible. Perhaps a attempted fix 254 will work and maybe it won't. The Green army does not always know for sure, particularly if the sabotage site 252 contains a type of mechanism which they had not seen, analyzed and understood before.

Next, the reconstructed ASV 210' is allowed to proceed forward, this time making its rerun 230 while using the attempted fix 254. If the attempted fix 254 is successful, the reconstructed ASV 210' will successfully reach a next optional stoppoint 235 along the road. Because of this success, the ASP will not initiate the stop signal 263 and/or the ASP will send back an OK-to-proceed signal such as 204 when the re-run ASV 210' reaches its next stoppoint 235. A preservation of the state of the ASV 210 should be entered in the log book 236 either when it reaches stoppoint 235 or somewhere else along the road after it has successfully passed beyond the attempted fix 254 without experiencing a failure event such as 208.

It is seen from the cartoon analogy of FIG. 2, that the Green army has devised a method for more quickly getting their General past the possibly-sabotaged sites (e.g., 251, 252) while reducing the risk that their General will be hurt by a failure event (e.g. 208). Of course, if the Blue army (bad guys) sets the time/distance delay on their bombs to be greater than the time/distance it takes for the Trailing Safer Vehicle (TSV) 220 to traverse the safety distance 215, it is possible that the TSV 220 will pass over sabotaged site 252 before the AFiRM 261 detects the failure event 208 associated with the ASV 210. In such a case, it may be necessary after the failure event 208 is detected to move the General to a new safer vehicle that replicates the $ASV_1$ state rather than allowing the General to continue riding in a vehicle that has already picked up a fault (a bomb, which will not manifest its existence until later). This further refinement will be described after a real rather than cartoon system in accordance with the invention is described.

Figure 3:
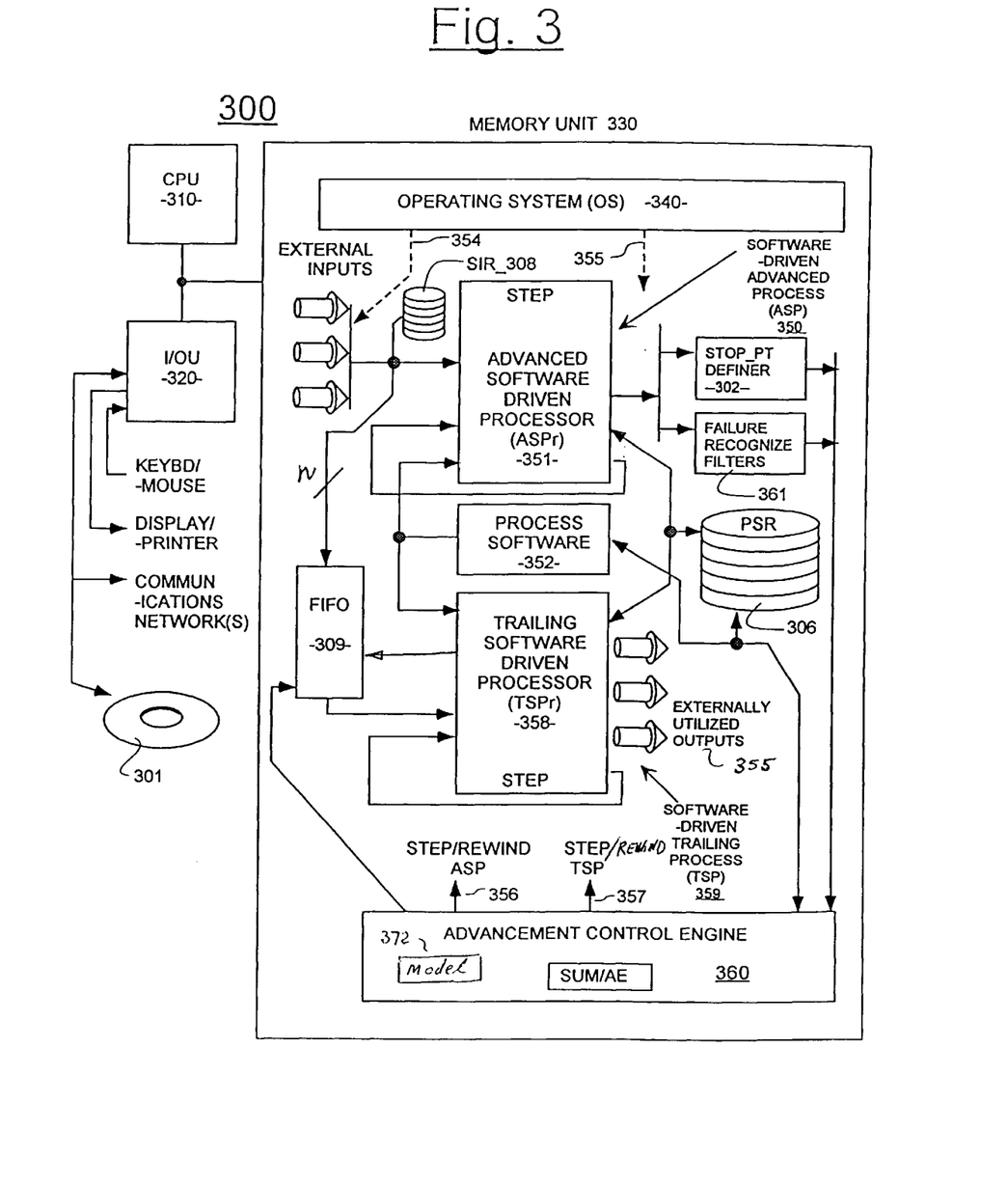
FIG. 3 is a block diagram of a computer system in accordance with the invention which includes an Advanced Software-driven Process (ASP) and a Trailing Software-driven Process (TSP)

Referring to FIG. 3, a block diagram is shown of a computer system 300 in accordance with the invention. Like reference numerals are used where practical to correspond with elements identified in the above-discussed figures. Accordingly, it is seen that computer system 300 includes a CPU 310 or like processing units, an I/OU unit 320 and a memory unit 330 including operating system 340.

An instructing means 301 such as floppy diskette (or a CD-ROM or a like computer instructing apparatus or a computer instructing signal derived therefrom) has been used to convert the conventional computer system 100 of FIG. 1A into a failure-avoiding computer system 300 such as depicted in FIG. 3.

In place of the single, software-driven process 150 of FIG. 1A, the improved, failure-avoiding computer system 300 has an Advanced Software-Driven Process (ASP) 350 and a Trailing Software-Driven Process (TSP) 359. As should be apparent, these respectively correspond to the ASV 210 and TSV 220 of FIG. 2. In the improved, failure-avoiding computer system 300, the OS 340 or other means are modified such that external inputs (354) are coupled by respective pipes/handles to respective inputs of Advanced Software-Driven Processor (ASPr) 351 while the externally utilized outputs (355) are produced from the output of Trailing Software-Driven Processor (TSPr) 358 and coupled to respective output pipes/handles 355. ASPr 351 and TSPr 358 are both driven by a common process software 352. Thus, ASP 350 is defined by the combination of ASPr 351 and common process software 352 while TSP 359 is defined by the overlapping combination of TSPr 358 and common process software 352. (It is possible to alternatively use a copy of 352 as the driving software for TSP 359, but that would waste more memory in unit 130.)

As its name implies, the Trailing Software-Driven Processor 358 sequences through process events after the ASPr 351 has sequenced through the same events. A FIFO-type of buffer (first-in, first-out) 309 or its equivalent should be provided for preserving external inputs (354) and sequencing those preserved inputs into the TSPr 358 at appropriate time points after they had been first received by the ASPr 351. The FIFO outputs will be released to the TSP 358 at the request of the TSP for next input.

An Advancement Control Engine 360 (which in one embodiment includes a SUM/AE) controls the movements (forward, backward or stop) of the ASP 350 and TSP 359 along process events and thereby determines the safety distance between the ASP and TSP.

Additionally, a System Input Repository (SIR) 308 is provided for preserving the system inputs sequence so that ASPr 351 may re-use them when so desired. In an alternate embodiment, SIR 308 and FIFO 309 are implemented as a combined data-storing unit.

The outputs of ASPr 351 are coupled to one or more failure recognizing filters 361. These failure recognizing filters 361 may be programmed before ASPr 351 begins operating or even after, and on-the-fly, to identify certain output events of the ASPr as failures. Recognition of a failure is signaled to the Advancement Control Engine 360. At that point, the ACE 360 will stop at least the ASPr 351, and preferably also the TSPr 358. A knowledge-deduction process of the SUM/AE then operates on the SUM model 372 to identify locations within process software 352 that might be faults which led to a recognized failure.

Process State Repository (PSR) 306 is coupled to ASPr 351 to preserve the state of ASPr 351 at desired time points (checkpoints). PSR is further coupled to TSPr 358 for causing the TSP 359 to acquire a checkpoint state of the ASP 350 in certain situations (explained below). After the most probable fault point is identified, the PSR 306 is used by ACE 360 to return the ASP 350 to a state preceding that in which it encountered the fault event.

If the identified fault is of a type that has been previously experienced and a solution has already been defined for such a fault, the solution may be applied by modifying one or all of process software 352 and ASPr 351 and model 372.

If a solution is not yet known, for example if the cause-effect (fault-to-failure) is one that has not been experienced before, then a solution is implemented on a trial-and-error basis.

The ASPr 351 which now has the attempted solution incorporated either into itself or into its process software 352, is restarted from the checkpoint state obtained from PSR 306. That checkpoint state precedes the fault event just as in FIG. 2, log book state 206 precedes fault event 207.

Advancement control engine ACE 360 performs functions of defining stoppoints setting and re-setting states of ASP 350 and TSP 359 and controlling the distance (chain of events) between ASP and TSP.

Figure 4:
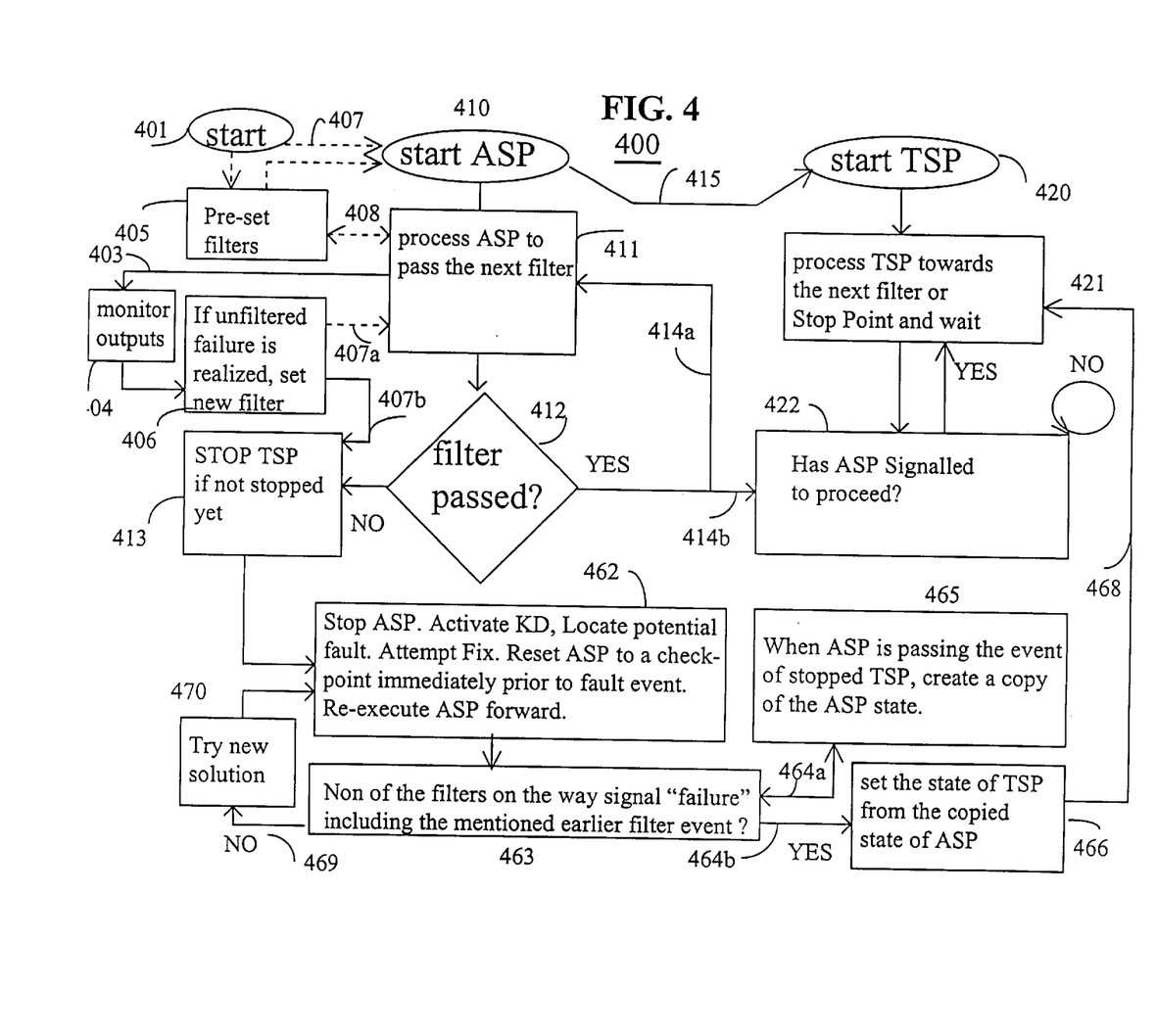
FIG. 4 is a flow chart of one method of operation in accordance with the invention.

Referring to FIG. 4, a flow chart for a controlled process 400 in accordance with the invention is depicted. Controlled process 400 starts at step 401. In an optional, subsequent step 405, failure-recognizing filters of the ASP are pre-set.

Such failure-recognizing filters (361 in FIG. 3) and the act of pre-setting them may take on many forms. For example, exception states may be defined for numerical output values that are out of expected range. One filter rule may have a statement such as: 'If the variable, AGE is less than zero or AGE is greater than 150 years, then signal a failure event.' Another failure rule may read: 'If the output variable, PROFIT is less than zero or greater than 1000%, then signal a failure event.' Failure events are generally application specific.

Failure event may be defined as any combination of conditions that are related to process events order or their values. Such combinations of conditions can describe absolutely any unwanted behavior or state of the process.

After carrying out pre-set step 405, control is passed to step 410. If there are no filters that need pre-setting in step 405, then optional bypass path 407 may be taken directly from start step 401 to initiation step 410. In step 410 the processing of the Advanced Software Process (ASP) is initiated.

In subsequent step 411 the ASP is moving forward along its chain of process events, trying to pass its outputs through the failure-recognizing filters without generating failure reports. In one possible embodiment, which is represented by dashed line 408, the failure conditions to be recognized by the failure-recognizing filters are set on-the-fly after the ASP initiation step 410 has been carried out. For example, it is only after receiving one screen output that a user can refer to its values in order to set up unwanted future events.

Dashed path 403 represents an additional or alternate embodiment in which the definition of certain failure events is not known until the failure is manifested on the output device. One or more selected outputs of the ASP are monitored in step 404. The human or automated verifier of the results monitored by monitor outputs 404 should have the capability to realize and declare a particular output events combination or value a failure. In step 406, if such a previously-unappreciated and unfiltered-for failure possibility is realized, the appropriate failure-recognizing filter is reprogrammed, or if there is no such filter, a new filter is created to recognize the failure event in the future. If the ASP has not yet experienced such a failure event, control is returned by way of path 407a back to processing step 411, where the ASP continues its forward movement along the current events chain. On the other hand, if the previously unrealized and unfiltered failure has occurred, control is passed by way of path 407b to step 413, where the latter step is described below.

As the ASP proceeds forward in step 411, it may eventually reach an output event in which the corresponding output is being watched by a failure-recognizing filter. Step 412 indicates that the failure-defining conditions of the filter may be either passed, thereby indicating no failure; or not passed and thereby indicate that the output event was recognized as a failure event.

If the ASP passes successfully through the filter (412) without failure, then return step 414a allows the ASP to continue moving forward along its events chain without incident. Connection 414b indicates a signaling from the ASP to the TSP that the ASP has successfully passed through the respective, filter-monitored event.

After the processing of the ASP was initiated in step 410, the processing of the TSP is initiated in step 420. The delay, or safety-trailing distance, between steps 410 and 420 is represented by connection 415.

In step 421 the initiated TSP is moving forward along the same events chain that the ASP has already passed over. The TSP is moving towards the next filter-monitored event or a next, predefined stoppoint, unless it is stopped on the way by a signal from the ASP that has experienced a failure and signals to the TSP to immediately stop (413). The TSP will then wait until the ASP signals back that it is safe to proceed therethrough.

At step 422 the TSP processing determines whether the ASP has signaled back that it is safe to proceed through the current filter-monitored event or stoppoint. If the answer is YES because a signal such as 414b has been received from the ASP operations, control is returned to step 421 where the TSP continues to move forward on the events chain towards the next filter-monitored event or stoppoint or until it is stopped by a signal from ASP (413). On the other hand, if the answer is NO, then the TSP remains halted at step 422 waiting for an OK-to-proceed signal from the ASP.

If at step 412 it is determined that the ASP has experienced a failure event, then at subsequent step 413 a signal is sent to the TSP to stop the TSP if it is not yet stopped in state 421 or 422. The TSP is placed into state 422 to await an OK-to-proceed signal from the ASP.

Step 462 also follows a detection of a failure in step 412. The ASP is stopped. A knowledge-deduction (KD) process is activated to locate the potential fault event in the past processing of the ASP which most probably led to the recognized failure event of step 412. An attempted fix or attempted solution is applied to the ASP. The state of the ASP is reset to a checkpoint state that is preferably closest to, but at least prior to the probable fault event. The ASP is then allowed to execute forward along the events chain towards the event that caused a filter to signal a failure in step 412.

In subsequent step 463, as the ASP proceeds forward from the checkpoint state towards the failure event detected in step 412, all the failure-recognizing filters are monitored to make sure that no failures are signaled on the way towards the filter event of step 412. If the ASP run is successful and no failure events are detected, by the time of the event where the TSP had been stopped, then a signal 464a is actuated to copy the state of the ASP at that event point and store it into the PSR (306) as indicated in box 465. The ASP continues to run while testing for any potential further failures (463), including for a potentially repeated failure at the event which caused step 412 to originally signal a failure.

If the ASP successfully traverses all the process events passing filters without failures, including the event which originally triggered steps 413, 462, then the YES-ALL path 464b is taken to step 466. In step 466, the copy of the ASP state that was made in step 465 is now moved into the TSP. Connection 468 represents a signaling from the ASP operations to the TSP operations that it is now safe to proceed forward from the TSP's current state, namely the state that the TSP acquired in step 466. TSP processing therefore returns to step 421 and continues from there.

If a failure condition is detected during the running of step 463, then path 469 is taken to step 470. In step 470 a different fix or solution is integrated into the ASP, where different potential fault(s) and at potentially different event(s) are tried to be fixed than those previously tried in step 462. The ASP is again reset to the checkpoint prior to the located fault event. Execution of the differently-fixed ASP is re-initiated from the checkpoint towards the event for which step 412 signaled a failure. Passage without failure is again tested for in step 463. If this does not work without failure, control path 469 returns to step 470 for yet another attempted solution, and so on.

Figure 5:
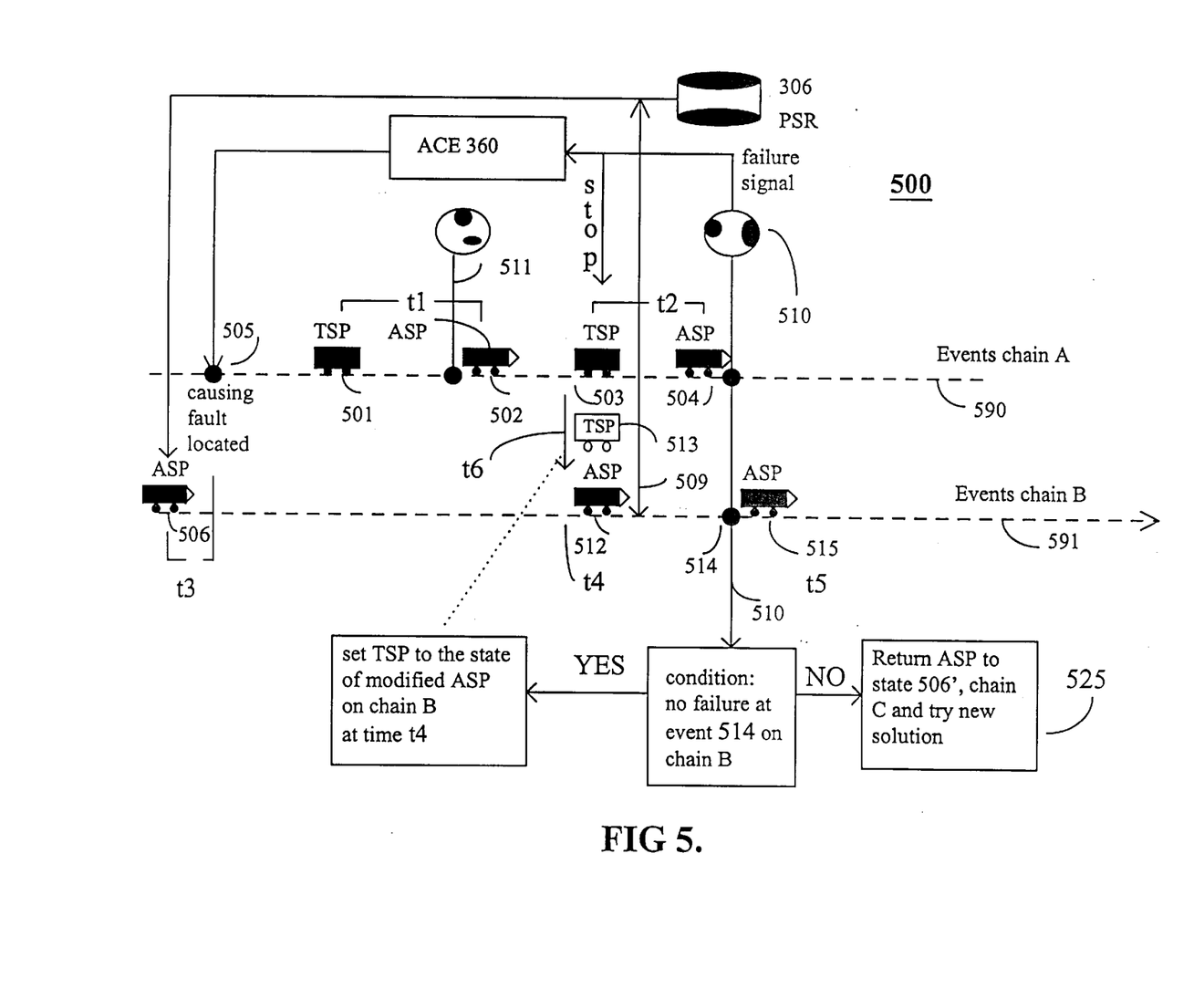
FIG. 5 is a schematic timing diagram for showing a sequence of states and filter conditions that may occur as the ASP and TSP proceed through events.

FIG. 5 shows a set of sequences 500 in accordance with the invention. A first chain of process events is represented by dashed lines 590 and designated as events chain 'A'. At time point t1 on chain 'A', the ASP is at event 502, having successfully passed through failure-recognizing filter 511 without detection of a failure event. Also at time t1, the TSP is trailing at process event 501. The TSP continues to move forward from process event 501 because the ASP (502) has not yet encountered a failure event.

At a subsequent time, t2, the TSP is trailing at event 503 while the ASP has encountered a failure at event 504 as it has progressed along events chain 'A'. Failure recognizing filter 510 detects the failure event within the ASP (504) and sends a failure signal to the ACE 360.

In response, the ACE 360 sends a stop-immediately signal to the TSP which is then situated at process event 503 on chain 'A'. The ACE 360 uses knowledge-deduction (KD) to identify the most probable, causal fault as being located at position 505 on chain 'A', where event 505 is well before event 501.

At time t3, the ACE 360 causes PSR 306 to generate a checkpoint replica of the ASP at process event point 506 on events chain 'B' (591). The second events chain 591 (B) are different from first chain 590 in that they are caused by an attempted solution or 'fix' made to the ASP at process event point 505 so as to try to prevent repetition of the failure.

The modified or corrected ASP is allowed to proceed forward from process event 506 until it reaches process event 512, at time t4. Process event 512 is essentially the same as process event 503. In other words, the ASP has reached at time t4, essentially the same state as the TSP was in at time t2 when the failure was detected by filter 510. Then, or shortly thereafter, a checkpoint snapshot of the state of the ASP (512 or a short time later) is made into PSR 306 as indicated by double-arrowed line 509.

The ASP is allowed to continue forward until it is at process event 515 and it has not yet caused a failure-recognizing filter to issue a failure-detected signal. Process event 515 is subsequent to process event 514. Process event 514 on chain 'B' corresponds to the process event 504 on chain 'A' where the ASP previously encountered the failure event.

At time t4, whereat the ASP has successfully passed through event 512 without failure, the snapshot of the ASP in state 512 is copied out of PSR 306.

If ASP successfully passes filter 514 at time t5 then TSP is reset from the saved state of ASP made to PSR 306 at the time t4. This new version of TSP 513 is dropped onto events chain 'B'. Thus in this condition the new TSP 513 is a replicated but trailing copy of the ASP 515 that was at the state of 512 time t4, that we now know to have successfully negotiated through event 514 without experiencing a failure.

Suppose that the ASP of chain 'B' does experience a failure either at 514 or somewhere before there as indicated by possibility box 525. If this occurs, the ASP is returned to a new state 506' on a new chain 'C' (not shown) and a new solution is attempted.

Figure 6:
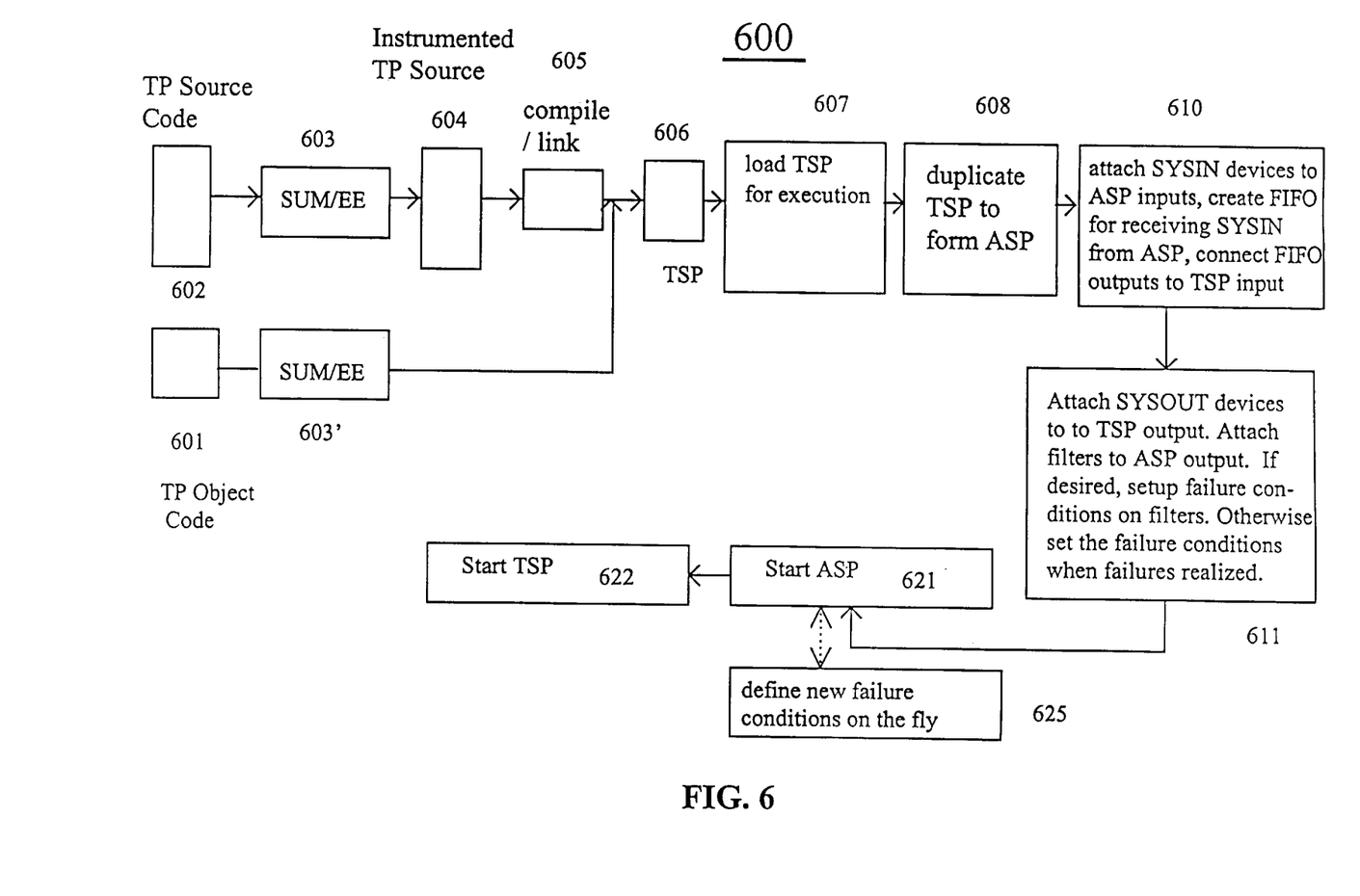
FIG. 6 is a flow chart showing a method in accordance with the invention for creating the TSP, the ASP and for defining failure conditions.

Referring to FIG. 6, there is shown a process for creating the TSP and ASP and for defining failure conditions. An original target process (TP) may be provided either in the form of source code 602 or object code 601. If only the source code 602 is present, then the SUM/EE 603 is used to convert the original source code 602 into instrumented source code 604. At step 605, the instrumented TP source code 604 is compiled and linked to form an instrumented object version of the TSP 606.

Target project object code 601 is transformed by the SUM/EE 603' into the instrumented object code 606. Instrumented object code 606 becomes the TSP 501 and ASP 502 of FIG. 5.

At step 607 the instrumented TSP 606 is loaded into the computer system for execution.

At step 608 the loaded TSP is duplicated to form the ASP.

At step 610 the operating system or other software means are instructed to attach the system input devices of the original target process to the ASP inputs. A FIFO(s) are created for storing a history of the system inputs and coupling the input history to the TSP inputs at a later time.

At step 611 output devices or handles that were originally designated for the target process (TP) are attached to the output of the TSP and failure-recognizing filters are further attached to the output of the ASP. If failure-recognizing filters are not yet set they may be set at this time. Otherwise, or additionally, the definition of failure conditions is programmed on-the-fly as the failure conditions are so realized (step 625).

ASP is started at box 621 and TSP is started later at box 622.

After the ASP has started (621), failure conditions may be realized and defined on-the-fly as they occur. This is represented by box 625.

It is seen from the above that structures and methods have been disclosed for reducing encounters with failures in the utilized outputs of a given process. The utilized outputs come from the Trailing Software Process while utilized inputs are first experienced by the Advanced Software Process. Fixes to problems, whether of a problem type that is known or of a type that has not been anticipated before, are first tried out on the ASP to assure that they will work before being applied to the TSP. In this way, the TSP is made not to experience the failures recognized in the ASP.

The above disclosure is to be taken as illustrative of the invention, not as limiting its scope or spirit. Numerous modifications and variations will become apparent to those skilled in the art after studying the above disclosure.

Given the above disclosure of general concepts and specific embodiments, the scope of protection sought is to be defined by the claims appended hereto.

What is claimed is:

1. A computer system comprising:
   (a) an Advanced Software Processor (ASPr) which sequences through process events;
   (b) a Trailing Software Processor (TSPr) which mimics the ASPr but sequences through process events after the ASPr has sequenced through the same process events;
   (c) a process state repository (PSR) operatively coupled to the ASPr for preserving checkpoint states of the ASPr;
   (d) a failure recognizer, operatively coupled to the ASPr for recognizing the occurrence of predefined failure events in the ASPr; and
   (e) a fault identifier that is responsive to detection by the failure recognizer of a failure event and in response, unwinds through processes of the ASPr to identify a possible fault event in the ASPr that led to the detected failure event, said fault identifier including an analytical engine that performs knowledge induction and knowledge deduction processes.

2. The computer system of claim 1 wherein:
   (d.1) the failure recognizer is reprogrammable so that definition of the failure events in the ASPr can be changed after the ASPr begins operating.

3. The computer system of claim 2 wherein:
   (d.2) the failure recognizer is reprogrammable on the fly so that definition of the failure events in the ASPr can be changed on the fly after the ASPr begins operating.

4. A method for causing utilized outputs of a computer process to avoid failure events comprising the steps of:
   (a) replicating a target process to thereby define an Advanced Software Process (ASP) which first sequences through process events and a Trailing Software Process (TSP) which mimics the ASP but sequences through process events after the ASP has sequenced through the same process events without experiencing an associated failure;
   (b) attaching utilized inputs to inputs of the ASP;
   (c) attaching utilized outputs to outputs of the TSP;
   (d) starting the ASP; and
   (e) after starting the ASP, starting the TSP to trail behind the ASP sufficiently far so that the ASP does not sequence through possibly faulty process events until after the ASP demonstrates that such possibly faulty process events do not lead to downstream failure.

5. The method of claim 4 and further including:
   (f) if the ASP encounters a first failure, rewinding the ASP and running the ASP through a revised process that is tailored to possibly correcting the fault that led to the encountered first failure, and only after the ASP successfully traverses without failure, the sequence where the first failure was encountered, allowing the ASP to continue with scouting through further processes.

6. The method of claim 4 and further including:
   (f) defining a plurality of safety checkpoints and pausing the TSP at a first of the checkpoints, until the ASP successfully passes a subsequent, second of the checkpoints.

7. The method of claim 4 and further including:
   defining a plurality of failure-detecting filters attached to outputs of the ASP for detecting corresponding failures of the ASP.

8. The method of claim 7 and further wherein:
   (f.1) said defining of the failure-detecting filters is programmable.

9. The method of claim 8 and further wherein:
   (f.2) said programmable defining of the failure-detecting filters can be programmably modified after the ASP begins operating.

10. The method of claim 8 and further wherein:
    (f.2) said programmable defining of the failure-detecting filters can be programmably modified on the fly after the ASP begins operating.

11. The method of claim 4 and further comprising:
    (f) defining a sequential set of checkpoints; and
    (g) causing the Trailing Software Processor (TSP) to pause at one of said checkpoints until the Advanced Software Processor (ASP) successfully sequences through a sequential subsequent one of said checkpoints without recognition of failure due to actions of the ASP.

12. A computer system comprising:
    (a) an Advanced Software Processor (ASPr) which sequences through process events;

(b) a Trailing Software Processor (TSPr) which mimics the ASPr but sequences through process events after the ASPr has sequenced through the same process events;

(c) a process state repository (PSR) operatively coupled to the ASPr for preserving checkpoint states of the ASPr;

(d) a failure recognizer operatively coupled to the ASPr for recognizing the occurrence of predefined failure events in the ASPr; and (e) a fault identifier that is responsive to detection by the failure recognizer of a failure event and in response, unwinds through processes of the ASPr to identify a possible fault event in the ASPr that led to the detected failure event, said computer system further comprising: means for repeatedly revising processes of the ASPr and rewinding the ASPr through such revised processes of the ASPr whose pre-revision counterparts were identified as containing a possible one or more fault events in the ASPr that led to the detected failure event, where the repeated rewinding continues until the ASPr sequences through the revised process events until the failure recognizer no longer recognizes the occurrence of one or more of said predefined failure events as the ASPr sequences through the revised process events.

13. A computer system comprising:

(a) storage means for storing revisable process software;

(b) an Advanced Software Driven Processor (ASPr) which sequences through process software obtained from the storage means;

(c) a Trailing Software Processor (TSPr) which mimics the ASPr but sequences through process process software obtained from the storage means after the ASPr has sequenced through the same process software;

(d) a plurality of programmable failure recognizers, operatively coupled to the ASPr for recognizing the occurrence of one or more programmably defined failure events caused by the ASPr having sequenced through process software obtained from the storage means; and (e) a fault identifier that is responsive to detection by one or more of the programmable failure recognizers of a failure event and in response, that unwinds through process software that the ASPr sequenced through, in order to identify a possible faulty part of the sequenced-through process software that probably caused the ASPr to produce the detected failure event; wherein said fault identifier includes a software understanding means for deducing what part or parts of the sequenced-through process software probably caused the ASPr to produce the detected failure event.

14. The computer system of claim 13 and further comprising:

(f) revising means, responsive to the fault identifier, for revising the identified and possible faulty part of the sequenced-through process software that the ASPr sequenced through.

15. The computer system of claim 14 and further comprising:

(g) retry means for causing the ASPr to sequence through the revised part of the previously sequenced-through process software.

* * * * *